United States Patent
Kariya et al.

(10) Patent No.: US 7,396,389 B2
(45) Date of Patent: Jul. 8, 2008

(54) ABNORMALITY DETECTION APPARATUS FOR EXHAUST GAS PURIFICATION APPARATUS FOR INTERNAL COMBUSTION ENGINE

(75) Inventors: Yasuhiro Kariya, Oobu (JP); Tsukasa Kuboshima, Okazaki (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 535 days.

(21) Appl. No.: 11/052,854

(22) Filed: Feb. 9, 2005

(65) Prior Publication Data

US 2005/0178272 A1    Aug. 18, 2005

(30) Foreign Application Priority Data

Feb. 12, 2004    (JP)    ............... 2004-035062

(51) Int. Cl.
*B01D 46/00* (2006.01)
*B01D 46/46* (2006.01)
*F01N 3/021* (2006.01)

(52) U.S. Cl. ............... 95/273; 95/19; 96/421; 55/282.2; 55/282.3; 55/385.3; 55/523; 55/DIG. 10; 55/DIG. 30; 60/277; 60/297; 60/311; 73/40.5 R; 73/49.5; 701/102; 701/114

(58) Field of Classification Search ............... 55/282.2, 55/282.3, 385.3, 523, DIG. 10, DIG. 30; 60/276, 277, 284, 297, 311; 73/40, 40.5 R, 73/46, 49.5; 701/101, 102, 114; 95/19, 273; 96/421

See application file for complete search history.

(56) References Cited

U.S. PATENT DOCUMENTS

| | | | | | |
|---|---|---|---|---|---|
| 3,696,666 | A | * | 10/1972 | Johnson et al. | 96/421 |
| 5,351,526 | A | * | 10/1994 | Krohm et al. | 73/40 |
| 5,617,722 | A | * | 4/1997 | Takaku | 60/277 |
| 5,848,372 | A | * | 12/1998 | Ito et al. | 701/101 |
| 6,594,987 | B2 | * | 7/2003 | Uranishi | 60/277 |
| 6,951,100 | B2 | * | 10/2005 | Kuboshima et al. | 60/311 |
| 6,984,252 | B2 | * | 1/2006 | Tanimoto | 96/421 |
| 7,031,827 | B2 | * | 4/2006 | Trudell et al. | 60/277 |
| 7,139,658 | B2 | * | 11/2006 | Satoya | 60/276 |

FOREIGN PATENT DOCUMENTS

| | | |
|---|---|---|
| JP | 2003-27919 | 1/2003 |
| JP | 2003-83035 | 3/2003 |

* cited by examiner

*Primary Examiner*—Jason M. Greene
(74) *Attorney, Agent, or Firm*—Nixon & Vanderhye PC

(57) ABSTRACT

Unless an abnormality exists in piping introducing a pressure from front and rear of DPF 22 into a differential pressure sensor 45, pulsations of pressure propagation through an exhaust passage 21 is offset in a detection value of a pressure difference of the differential pressure sensor 45, and an amplitude of the detection value of the DPF pressure difference resulting from pulsation of the pressure becomes small. If a crack exists in one of the piping 3a and 3b, the influence of a pulsation of the pressure appears in the DPF pressure difference and the amplitude of the detection value of the DPF pressure difference becomes large. The amplitude of the detection value of the DPF pressure difference is compared with the reference value and is detected as being abnormal when it is large, utilizing the phenomenon described above.

10 Claims, 7 Drawing Sheets

ABNORMALITY DETECTION APPARATUS FOR EXHAUST GAS PURIFICATION APPARATUS FOR INTERNAL COMBUSTION ENGINE

BACKGROUND OF THE INVENTION

1. Field of the Invention

This invention relates to an exhaust gas purification apparatus, having a particulate filter, for an internal combustion engine. More particularly, the invention relates to an abnormality detection apparatus for detecting an abnormality in an exhaust gas purification apparatus for an internal combustion engine.

2. Description of the Related Art

Reduction of exhaust gas emission has been required in recent years for internal combustion engines mounted in automobiles and so forth. In a compression ignition type Diesel engine using light oil as fuel, in particular, removal of particulate matters such as soot and SOF (soluble organic fraction) in the exhaust gas has been necessary in addition to removal of CO, HC and NOx. Therefore, it has been customary to arrange a particulate filter in an exhaust passage and to trap particulate matters in the exhaust gas.

The particulate filter allows the passage of an inflowing exhaust gas through a porous partition wall and traps, thereby, the particulate matters in the exhaust gas on the surface of the partition wall and the pores. When an amount of the particulate matters so collected becomes excessively great, a back pressure on the internal combustion engine rises due to the increase in the flow resistance in the particular filter and the increase of the back pressure invites a drop in the output. Therefore, it is necessary to appropriately remove the particulate matters accumulated on the particulate filter, to regenerate the particulate filter and to recover the flow capacity of the particulate filter.

A particulate filter that makes it possible to regenerate during the operation of the internal combustion engine includes the one that includes an oxide catalyst such as platinum. This filter supplies fuel to the particulate filter by means of post-injection for injecting the fuel in the exhaust stroke, and oxidizes and removes the accumulated particulate matters that are not easily oxidized in comparison with fuel injection by utilizing the combustion heat.

The fuel consumption is deteriorated when regeneration of the particulate filter is done frequently. When the interval to the next regeneration is too long, on the other hand, the amount of the particulate matters becomes excessively great at the time of the start of regeneration and the accumulated particulate matters are rapidly burnt in the regeneration processing. The particulate filter reaches an abnormally high temperature, and is likely to be broken, in this case. It is therefore desirable to detect the deposition condition of the particulate matters and to decide the regeneration timing of the particulate filter. Japanese Unexamined Patent Publication Nos. 2003-279191 and 2003-83035 disclose a technology that detects a pressure difference by utilizing the phenomenon that the pressure difference between an inlet and an outlet of the particulate filter increases due to the flow resistance resulting from the increase of the amount of the particulate matters described above, and determines the regeneration timing when the pressure difference detected exceeds a predetermined value.

A pressure sensor for detecting the differential pressure is connected to a pressure introduction piping between upstream and downstream sides of the exhaust passage while interposing the particulate filter. This piping is generally a heat-resistant metal pipe or rubber hose. When breakage such as a crack, fall-off, clogging, etc, of the piping occurs depending on the use condition, detection accuracy of the pressure difference drops and the amount of the particulate matters cannot be known. The exhaust gas may leak to the outside when the piping is broken or falls off.

SUMMARY OF THE INVENTION

In view of the problems described above, the invention aims at providing an abnormality detection apparatus capable of easily sensing a detection abnormality of the pressure difference of the particulate filter, when such detection abnormality occurs, due to the breakage described above.

According to one aspect of the invention, there is provided an abnormality detection apparatus of an exhaust gas purification apparatus for an internal combustion engine, having a particulate filter for trapping particulate matters in an exhaust gas disposed at an intermediate part of an exhaust passage by introducing an inlet pressure and an outlet pressure of the particulate filter into a differential pressure sensor through respective piping, detecting a pressure difference at an inlet and an outlet of the particulate filter by using the differential pressure sensor and detecting an amount of the particulate matters accumulated to the particulate filter, comprising pulsation measurement means for measuring a magnitude of pulsation of a detection value of the pressure difference; and abnormality detection means for detecting the piping as being abnormal when the magnitude of pulsation of the pressure difference detection value measured is greater than a predetermined reference value.

Pressure pulsations propagating towards the differential pressure sensor passes through the piping introducing the pressure on the inlet side of the particulate filter and through the particulate filter and then reach the differential pressure sensor through the piping introducing the pressure on the outlet side of the particulate filter. The pressure pulsations taking these two paths have substantially the same phase in the differential pressure sensor and their influences on the detection pressure difference of the differential pressure sensor are offset to certain extents unless breakage of the piping exists. Therefore, the pulsation does not appear greatly in the detection value of the pressure difference.

When any breakage, or the like, exists in the piping, on the other hand, the magnitudes of the pressure pulsations reaching the differential pressure sensor become unbalanced between the two paths and the influences of the pressure pulsation greatly appear in the detection value of the pressure difference.

Because it is necessary to only watch the behavior of the detection value of the pressure difference without directly checking the leak of the piping, the invention is easy to practice.

The invention is particularly effective for detecting an abnormality of the downstream piping for which detection has been difficult because the change of the pressure difference is small.

In the abnormality detection apparatus of an exhaust gas purification apparatus for an internal combustion engine described above, the abnormality detection means sets the reference value in accordance with at least one of the number of revolutions of the internal combustion engine, an engine output torque and a particulate accumulation state, to the particulate filters. Because the magnitude of the pulsation of the exhaust gas pressure changes in accordance with the number of revolutions of the internal combustion engine, the engine output torque and the particulate amount to the particulate filter, abnormality detection can be made accurately by setting the reference value in accordance with these factors.

In the abnormality detection apparatus of an exhaust gas purification apparatus for an internal combustion engine described above, the abnormality detection means sets the reference value to a smaller value at least when the number of revolutions of the internal combustion engine is greater, or at least when the engine output torque is smaller or at least when the particulate amount to the particulate filter is smaller.

The magnitude of the pulsation of the exhaust gas pressure exhibits the tendency to decrease, at least when the number of revolutions of the internal combustion engine is greater, or at least when the engine output torque becomes smaller or at least when the particulate amount to the particulate filter becomes smaller. Therefore, the pulsation component contained in the detection value of the pressure difference becomes smaller. When the reference value is set to a smaller value at this time, breakage, etc, of the piping can be detection with high sensitivity.

In the abnormality detection apparatus of an exhaust gas purification apparatus for an internal combustion engine described above, piping connecting the particulate filter and the differential pressure sensor on the inlet side of the particulate filter is set to substantially the same length as that of piping connecting the particulate filter and the differential pressure sensor on the outlet side of the particulate filter.

Because the phases of the pressure pulsations propagating through the two paths can be substantially aligned, the pulsation of the pressure difference detection value hardly occurs under the normal condition and breakage, etc, of the piping can be detected with high sensitivity.

In the abnormality detection apparatus of an exhaust gas purification apparatus for an internal combustion engine described above, the pulsation measurement means calculates a mean value among multi-cylinder as the magnitude of pulsation of the detection values of the pressure difference and the abnormality detection means compares the mean value with the reference value.

Because the pressure pulsation results from an explosion in each cylinder, great variance is likely to occur among a plurality of cylinders. Because abnormality of the piping is detected on the basis of the mean value among a plurality of cylinders, erroneous detection resulting from the variance of the pressure pulsation among multi-cylinder can be avoided.

The present invention will be more fully understood from the following description taken with reference to the accompanying drawings and the preferred embodiment of the invention.

DESCRIPTION OF THE PREFERRED EMBODIMENTS

Figure 1:
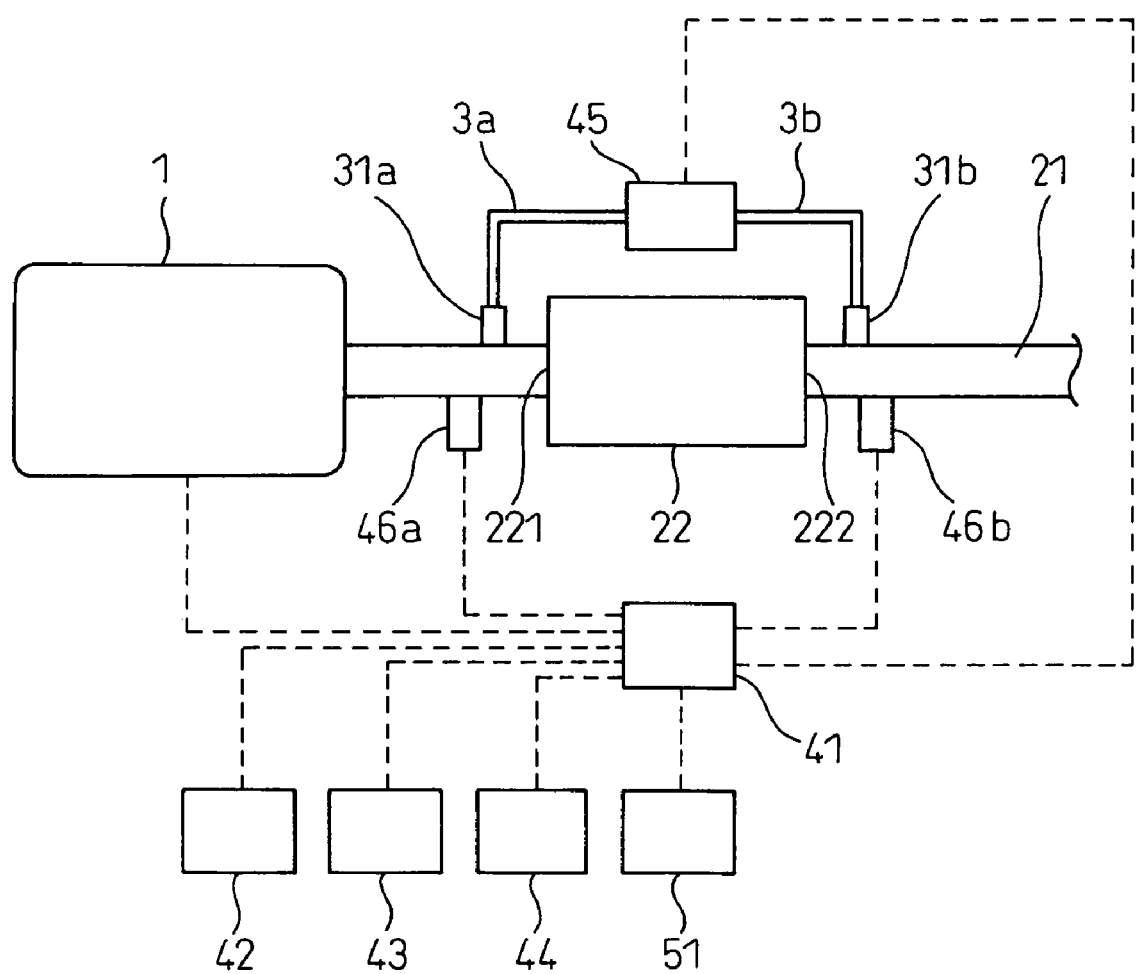
FIG. 1 is a schematic overall structural view of an internal combustion engine when an abnormality detection apparatus according to the invention is applied to an exhaust gas purification apparatus of an internal combustion engine.

FIG. 1 shows a Diesel engine having an exhaust gas purification apparatus according to a first embodiment of the invention. An engine main body 1 includes multi-cylinder. An air-fuel mixture is serially burnt inside the cylinders and turning power is outputted from a crank shaft, not shown in the drawing. The following explanation will be given on the case where the engine main body 1 has 4 cylinders. The exhaust gas emitted from each cylinder after combustion of the air-fuel mixture in each cylinder is purified by the apparatus arranged in an exhaust passage 21. A particulate filter (hereinafter called "DPF (Diesel Particulate Filter)" from time to time) 22 is arranged as one of such apparatuses.

The DPF 22 is produced by shaping heat-resistant ceramics such as cordierite into a honeycomb structure and is sealed in such a fashion that a large number of cells as the gas passages alternately form inlets 221 and outlets 222 at both ends of the DPF 22. An oxide catalyst such as Pt (Platinum) is applied to the cell wall surfaces. The overall shape of the DPF 22 has a round section exhibiting the honeycomb structure. The exhaust gas flowing through the exhaust passage 21 flows towards the downstream side while passing through the porous partition walls among the cells of the DPF 22, and traps the particulate matters during its flow. The particulate matters are thus accumulated gradually.

A differential pressure sensor 45 for detecting a pressure difference between the inlet and outlet sides of the DPF 22 is connected to the exhaust passage 21 to detect the amount (PM (Particulate Matters) amount) of the particulate matters on the DPF 22. One of the ends of the differential pressure sensor 45 is communicated with the inlet 221 of the DPF 22 through a piping 3a and the other end, with the outlet 222 of the DPF 22 through a piping 3b and outputs a signal corresponding to the pressure difference to an ECU (Electronic Control Unit) 41. The piping 3a will be called "DPF front side piping 3a" and the piping 3b, "DPF rear side piping 3b", from time to time. Both front side and rear side piping 3a and 3b are set to substantially the same length.

Exhaust gas temperature sensors 46a and 46b are disposed in the exhaust passage 21 immediately upstream and immediately downstream of the DPF 22. These exhaust gas temperature sensors 46a and 46b are connected to the ECU 41. The exhaust gas temperature sensor 46a detects the gas temperature of the inlet 221 of the DPF 22 (hereinafter called appropriately "DPF inlet gas temperature") and the exhaust gas temperature sensor 46b detects the gas temperature at the outlet 222 (hereinafter called appropriately "DPF outlet gas temperature") and outputs it to the ECU 41.

Signals from a number-of-revolution sensor 42 for detecting the number of revolutions of the engine, an acceleration stroke sensor 43 for detecting opening degree of an accelerator and an air flow meter for detecting a fresh air amount are outputted to the ECU 41.

The ECU 41 is mainly constituted by a micro-computer, calculates a fuel injection amount and injection timing in accordance with the operating condition known from the output signals from the various sensors described above and controls each part of the engine. The ECU 41 monitors the PM amount in the DPF 22 and judges whether or not the DPF has reached the regeneration timing. This judgment is made by calculating the PM amount on the basis of a two-dimensional map in which the PM amount is caused to correspond to the detection value of the DPF pressure difference and to the exhaust gas flow rate and judging whether or not the PM amount so calculated exceeds a reference value. Incidentally, the exhaust gas flow rate is calculated on the basis of the DPF inlet temperature and the DPF outlet temperature that are detected by the exhaust gas temperature sensors 46a and 46b. The increase of the number of moles due to combustion may of course be taken into account.

The ECU 41 turns on and drives an MIL (malfunction indicator lamp) 51 mounted to an instrument panel besides driving control of the injectors for fuel injection of the engine main body 1.

Figure 2:
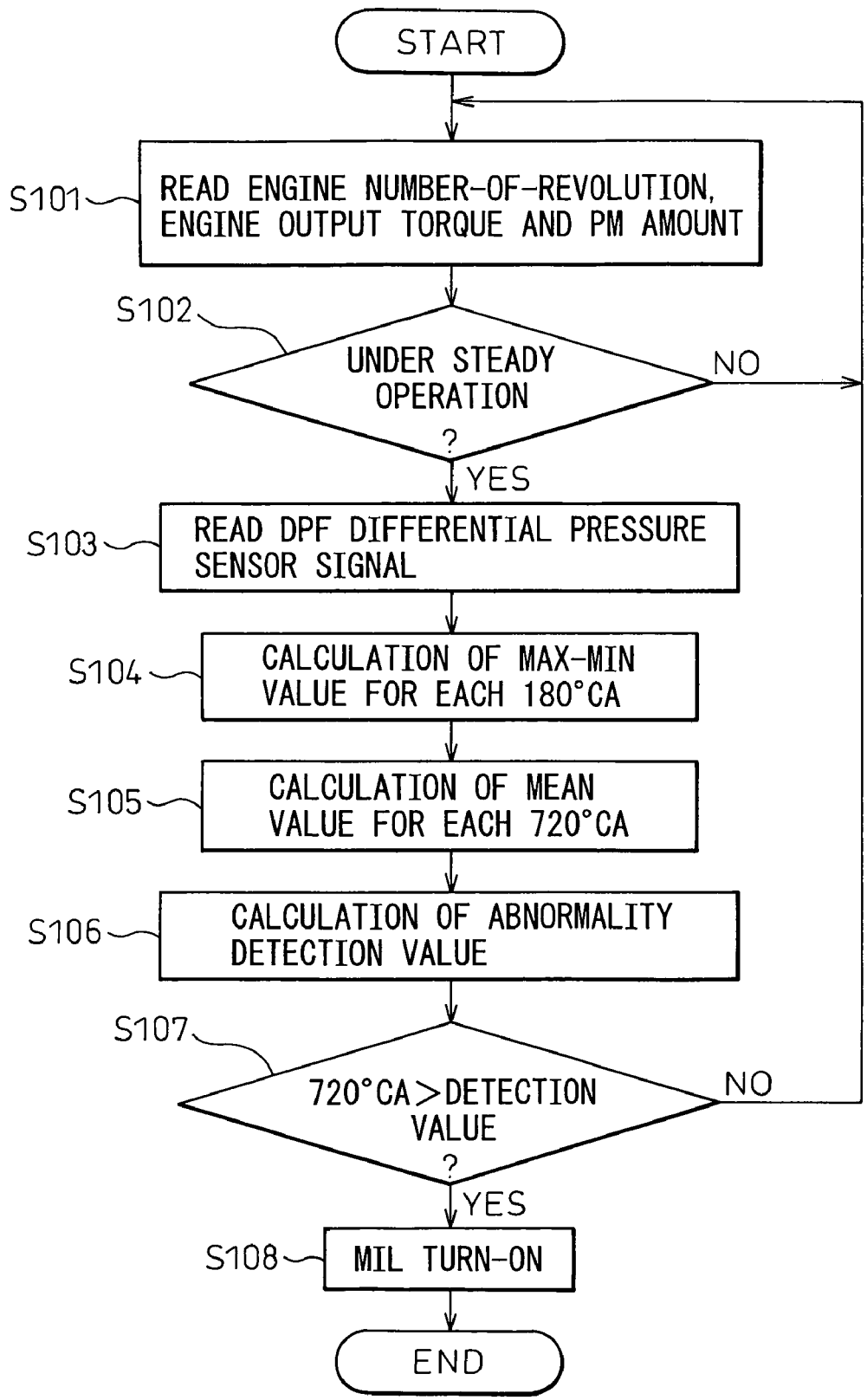
FIG. 2 is a flowchart showing control executed by ECU constituting the abnormality detection apparatus.

The ECU 41 constitutes a part of the abnormality detection apparatus and FIG. 2 shows abnormality detection control of the DPF pressure difference detection system executed by the ECU 41. The number-of-revolution of the engine, the engine output torque and the PM deposition amount are read in step S101. Whether or not the engine is under a steady operating condition is judged in step S102. When the result proves YES, the flow proceeds to step S103 and when it is NO, the flow returns to step S101. Whether or not the engine is under the steady operating condition is judged depending on whether or not the change width of the number of revolutions of the engine within a predetermined time is not greater than a reference value set in advance. When the change in the number of revolutions of the engine is below the reference value set in advance, the engine can be judged as being under a steady operating condition.

Steps S103 to S105 are processing as a pulsation measurement means. The signal value of the DPF differential pressure sensor 45 (hereinafter called "DPF pressure difference detection value", whenever necessary) is read in step S103. The read timing is the one that is in synchronism with the revolution of the engine such as each crank angle (CA) 20°.

The subsequent step S104 is executed when the DPF pressure difference detection value for crank angle 180° has been read up to this time, that is, in each crank angle 180° interval. In this step S104, the DPF pressure difference values so read are compared to determine their maximum and minimum values. The difference between the maximum value and the minimum value is temporarily stored as the amplitude of the DPF pressure difference detection value.

Step S105 is executed when the amplitude of the DPF pressure difference detection value calculated in step S104 is calculated and is temporarily stored four times. In step S105, the mean value of the amplitudes of the DPF pressure difference detection values of four times (hereinafter called appropriately "amplitude mean value") is calculated. The maximum values and the minimum values acquired in the each crank angle 180° interval will be called (Max1, Min1), (Max2, Min2), (Max3, Min3) and (Max4, Min4). Then, the amplitude mean value is given by the following formula:

$$\text{amplitude mean value} = [(\text{Max1} - \text{Min1}) + (\text{Max2} - \text{Min2}) + (\text{Max3} - \text{Min3}) + (\text{Max4} - \text{Min4})]/4 \quad (1)$$

Steps S106 and S107 are a process as abnormality detection means. In Step S106, an abnormality detection value is calculated as a reference value for judging whether or not the amplitude mean value is abnormal. The abnormality detection value is calculated on the basis of the number of revolutions of the engine, the engine output torque and the PM amount that are read in step S101. Calculation is made on the basis of the one-dimensional map in which the abnormality judgment value corresponds in advance to the number-of-revolutions of the engine, the engine output torque and the PM amount. In this map, a smaller abnormality detection value is given at least when the number-of-revolutions of the engine is greater or at least when the engine output torque is smaller or at least when the PM amount is smaller. The map is stored in the ROM together with the control program.

Alternatively, the base value of the abnormality judgment value determined on the one-dimensional map corresponding to the number of revolutions of the engine may be corrected by multiplying coefficients corresponding to the engine output torque and the PM amount. The correction coefficients in this case are set so that they become smaller when the engine output torque is smaller and when the PM amount is smaller.

To simply detect an abnormality, the abnormality value may be determined from the one-dimensional map relying on the number of revolutions of the engine. In this case, the abnormality detection value is decided while the engine output torque and the PM amount are the maximum values under the condition for the abnormality detection. This method can drastically shorten the time required for deciding the abnormality detection value.

In step S107, whether or not the amplitude mean value calculated in step S105 exceeds the abnormality detection value calculated in step S106. When the detection result proves YES, the MIL 51 is turned on in step S108 and the occurrence of abnormality is reported to the driver. When the result proves NO, the flow returns to step S101.

Figure 3:
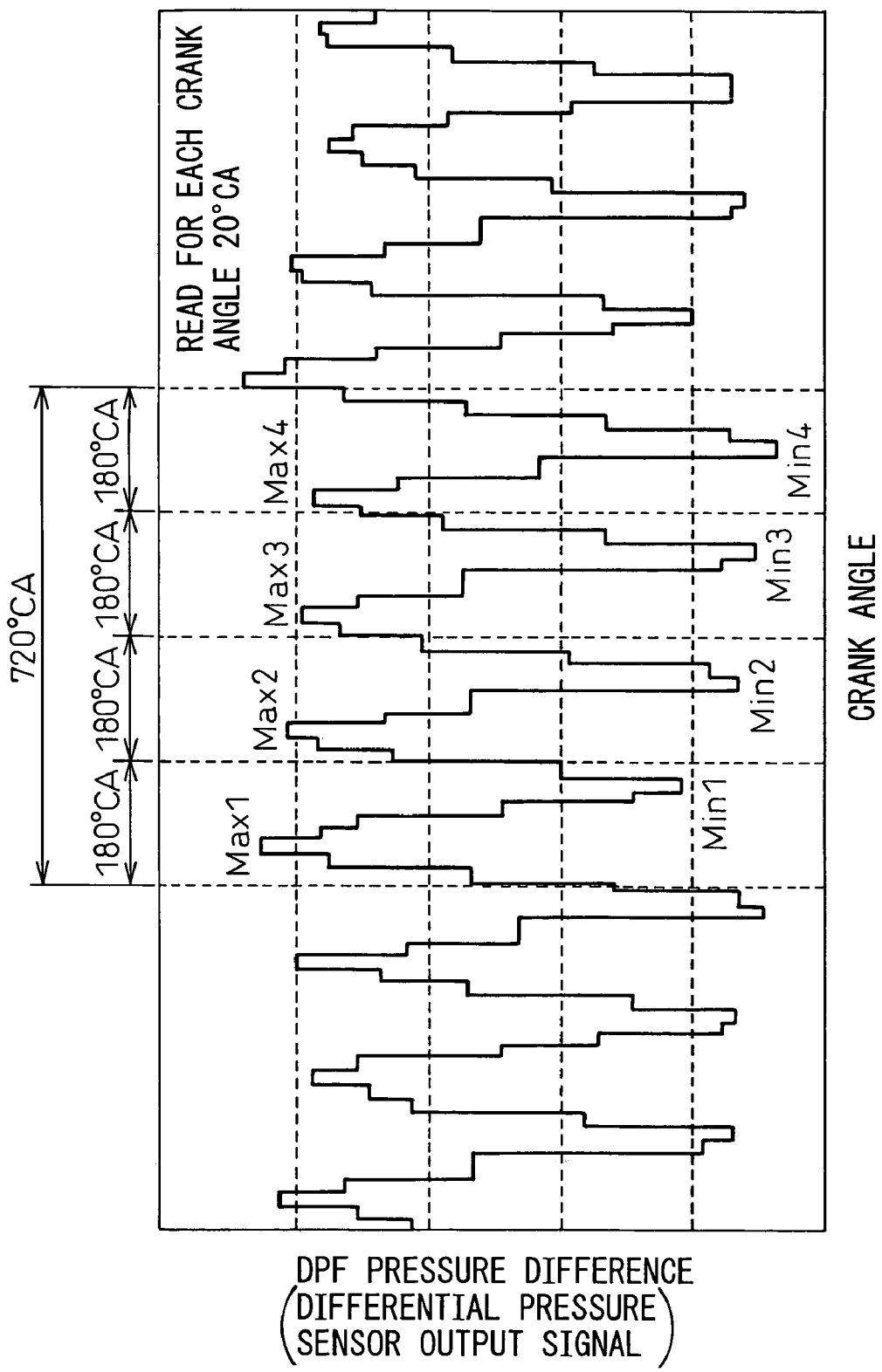
FIG. 3 is a first graph useful for explaining an ordinary operation of the abnormality detection apparatus.

Having the construction described above, this embodiment provides the following effects. FIG. 3 shows the change with time of the output signal of the differential pressure sensor 45 read in each crank angle 20° interval. The influences of the exhaust gas pressure propagating from the engine main body 1 through the exhaust passage 21 due to explosion of the air-fuel mixture are observed. The pulsation cycle is substantially crank angle 180°. This is because the pressure pulsation results from the explosion of the air-fuel mixture and because the explosion of the air-fuel mixture is made in about crank angle 180° intervals in the four-cylinder engine. Taking these factors into consideration, this embodiment determines the maximum value and the minimum value of the DPF pressure difference detection values in the zone of about crank angle 180° (step S104). Pulsation of four times is averaged (step S105) to calculate the average of all the four cylinders in which explosion is serially made. Variance among the cylinders can thus be eliminated.

Figure 4:
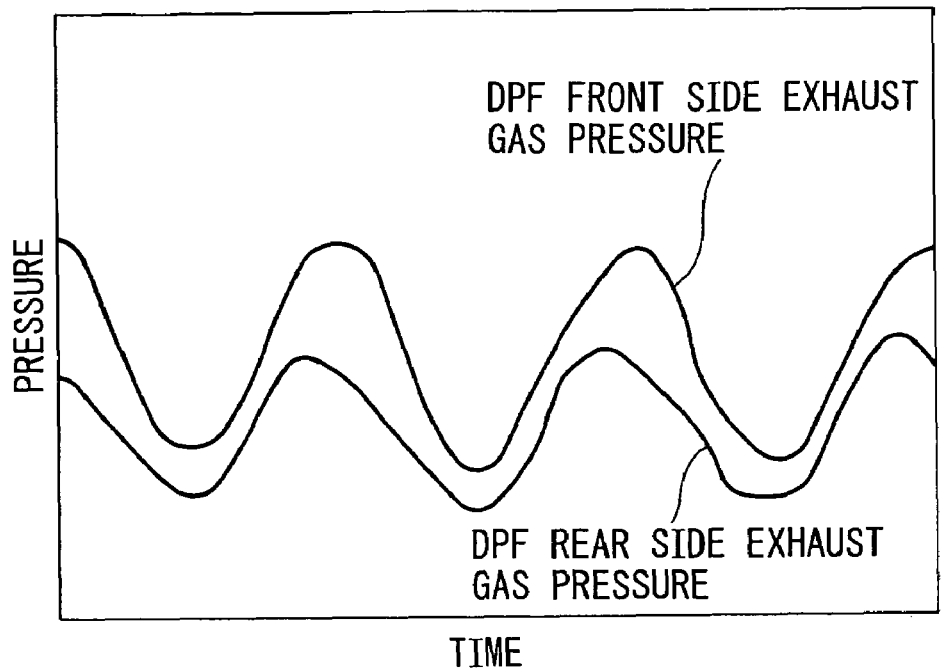
FIG. 4 is a second graph useful for explaining the ordinary operation of the abnormality detection apparatus.
Figure 5:
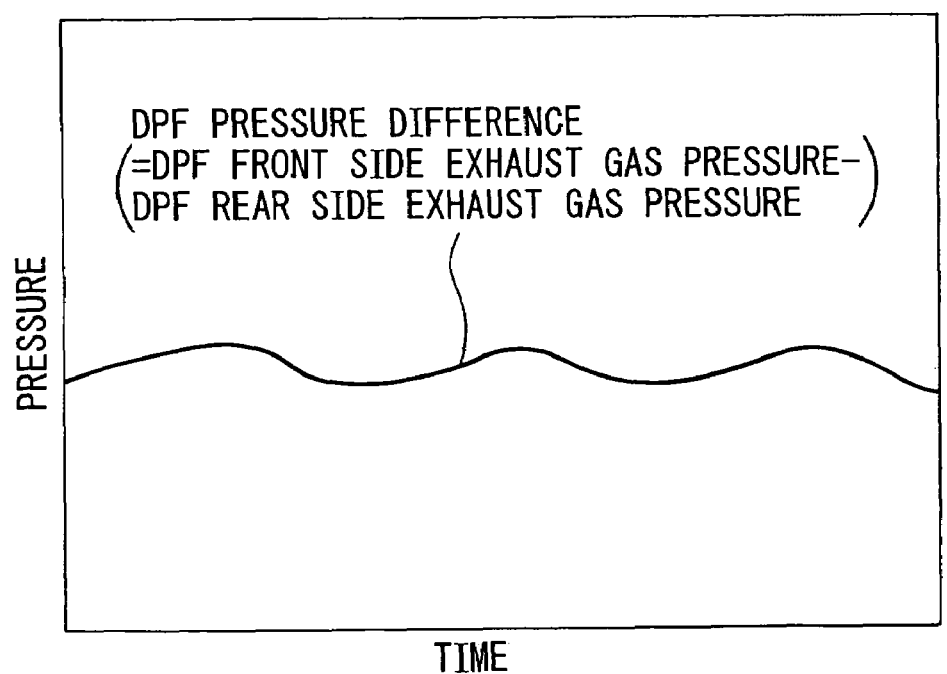
FIG. 5 is a graph useful for explaining the operation of the abnormality detection apparatus when the exhaust gas purification apparatus of the internal combustion engine is normal.

When any abnormality such a breakage of the pipe wall of the piping 3a and 3b, a seal defect and a fall-off at the connection portion with the exhaust passage 21, clogging, etc, occurs, the occurrence of abnormality is detected in the following way by using the amplitude mean value so acquired, and the MIL 51 is turned on. FIG. 4 shows the change with time of the exhaust gas pressure. The drawings shows the DPF front side exhaust gas pressure introduced through the DPF front side piping 3a and the DPF rear side exhaust gas pressure introduced through the DPF rear side piping 3b. FIG. 5 shows the DPF pressure difference detected by the DPF differential pressure sensor 45 under the normal condition in which abnormality described above does not exist, that is, the difference between the DPF front side exhaust gas pressure and the DPF rear side exhaust gas pressure.

Figure 6A:
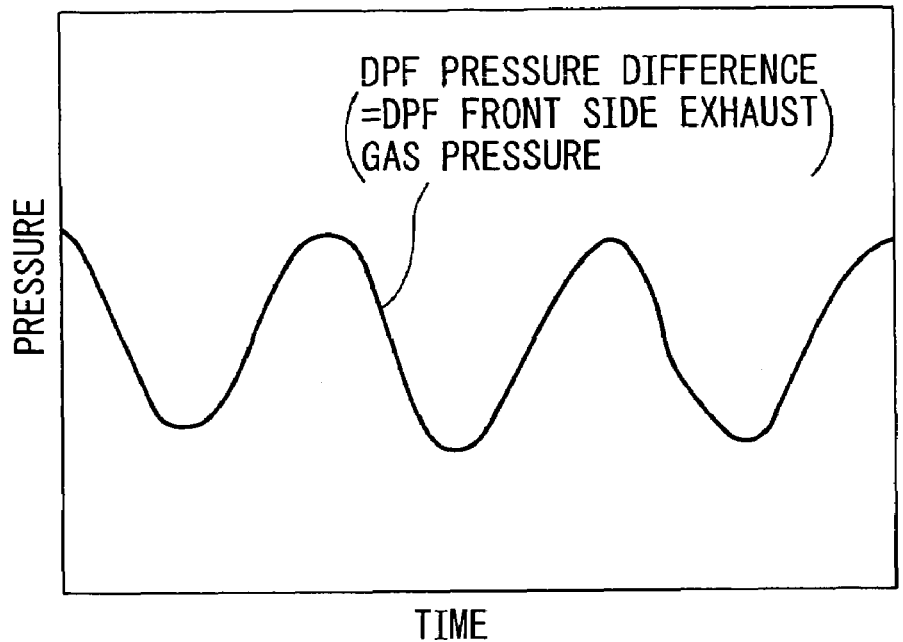
FIG. 6A is a graph useful for explaining the operation of the abnormality detection apparatus when the exhaust gas purification apparatus of the internal combustion engine is abnormal.

Because the length of the DPF front side piping 3a is set to that of the DPF rear side piping 3b, the difference of the propagation time of the pressure pulsation between the DPF front side exhaust gas pressure and the DPF rear side exhaust gas pressure is the difference in whether or not the DPF 22 is contained as the path of the pressure pulsation and is relatively small. Therefore, though the pulsation resulting from pulsation of the exhaust gas pressure appears in the DPF front side exhaust gas pressure, too, the components of the pressure pulsation of the DPF front side exhaust gas pressure and the DPF rear side exhaust gas pressure offset each other to a certain extent when the piping 3a and 3b are normal and the influences of the pressure pulsation become small as shown in FIG. 5. In contrast, the DPF rear side exhaust gas pressure drops substantially to the atmospheric pressure due to a leak from cracks when an abnormality such as cracks exists in the DPF rear side piping 3b or due to cut-off from the exhaust passage side 21 that is at the positive pressure relative to the atmospheric pressure when clogging of the DPF rear side piping 3b exists as shown in FIG. 6A, and the pressure pulsation becomes small, too. In consequence, the amplitude of the DPF pressure difference detection value becomes great. When the amplitude exceeds the abnormality detection value, the piping 3b can be detected as being abnormal.

Figure 6B:
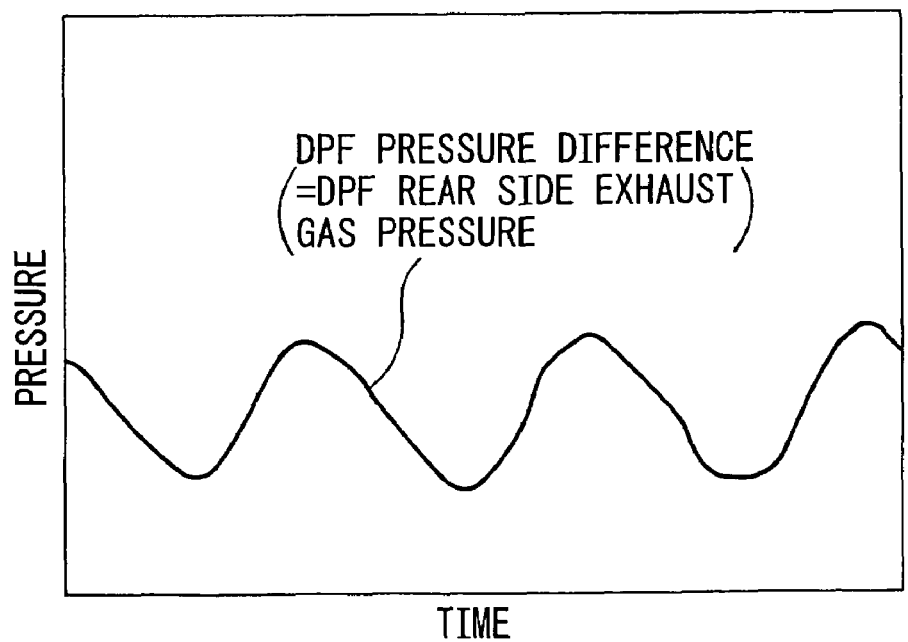
FIG. 6B is a graph useful for explaining the operation when the exhaust gas purification apparatus of the internal combustion engine is under another abnormal condition.

In FIG. 6B, showing the case where abnormality such as cracks exists in the DPF front side piping 3a, on the other hand, the pressure pulsation becomes small at the DPF front side exhaust gas pressure due to the leak from the cracks and the amplitude of the DPF pressure difference becomes great.

Figure 7:
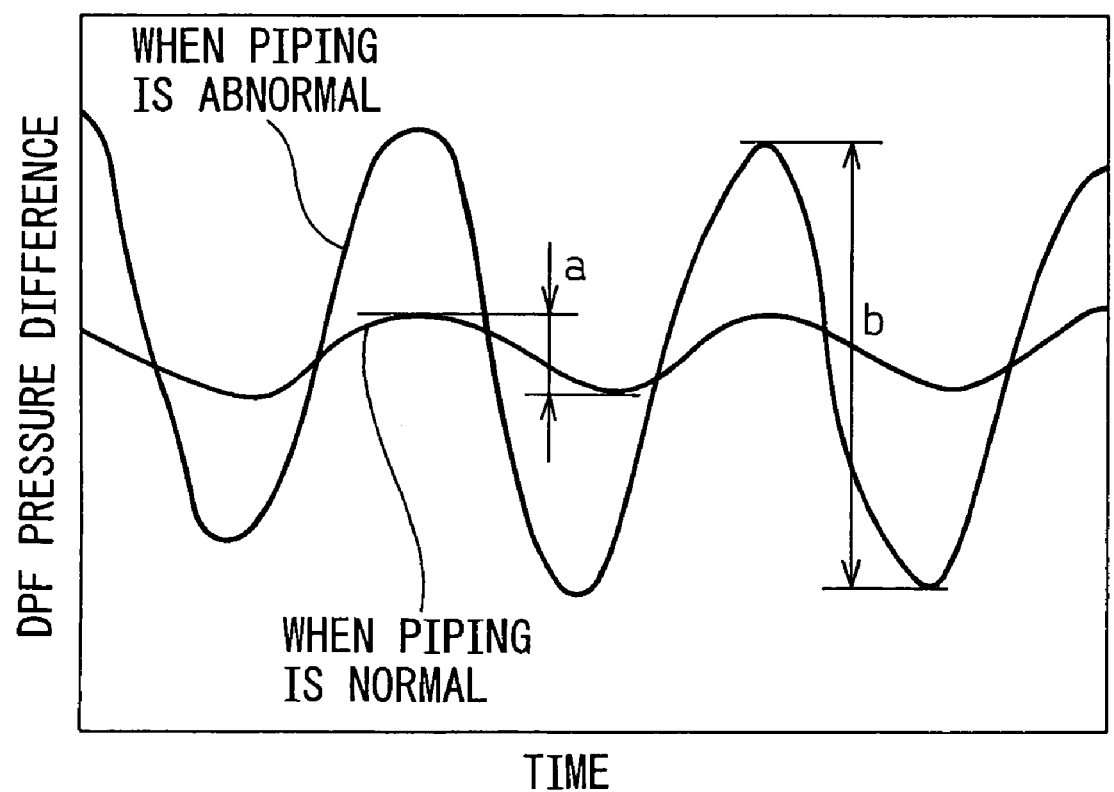
FIG. 7 is a third graph useful for explaining an ordinary operation of the abnormality detection apparatus.

Therefore, when the amplitude is smaller (indicated by symbol a in FIG. 7) by comparing the amplitude of the DPF pressure difference detection value with the abnormality detection value, the condition can be detected as normal and when the amplitude is greater, the condition can be detected as abnormal (indicated by symbol b in the drawing).

Incidentally, when an abnormality such as cracks exists in the DPF front side piping 3a, the DPF pressure difference takes a negative value and the occurrence of abnormality can be detected from the negative value. When an abnormality exists in the DPF rear side piping 3b, such a change does not occur. Therefore, the invention is particularly effective.

Figure 8A:
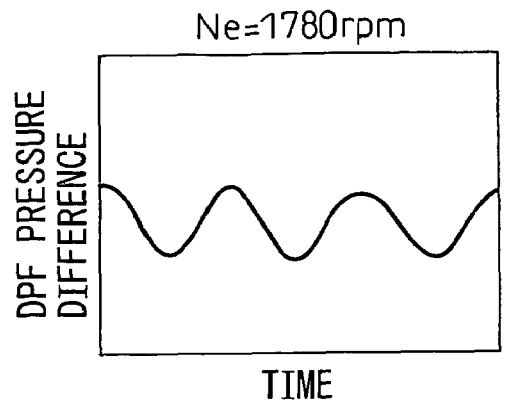
FIG. 8A is a fourth graph useful for explaining the ordinary operation of the abnormality detection apparatus.
Figure 8B:
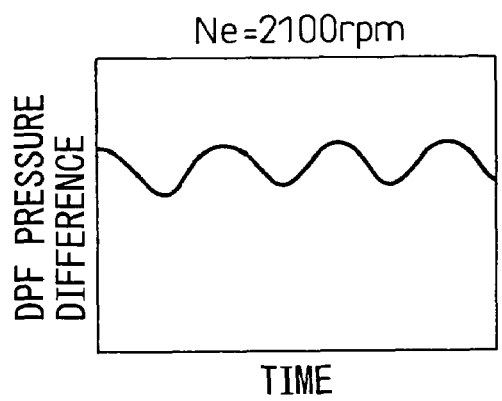
FIG. 8B is a fifth graph useful for explaining the ordinary operation of the abnormality detection apparatus and FIG. 8C is a sixth graph useful for explaining the ordinary operation of the abnormality detection apparatus.
Figure 8C:
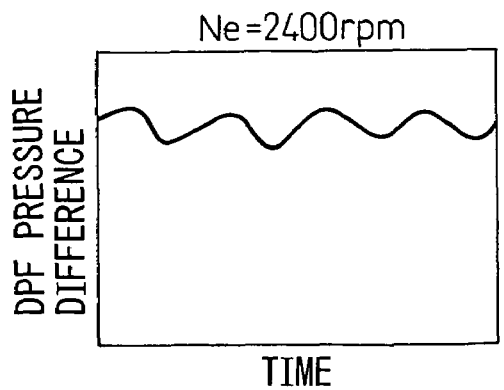

FIGS. 8A to 8C show the change with time of the DPF pressure difference, and the numbers of revolutions of the engine are mutually different. The drawings are plotted from the side of the low number of revolutions to 8A, 8B and 8C. The greater the number of revolutions, the smaller becomes the amplitude of the DPF pressure difference. Therefore, an abnormality is not likely to be noticed in the high number of revolution zone depending on the abnormality detection value even though abnormality can be appropriately detected in the low number of revolution zone. The abnormality detection value is preferably smaller in order to improve the detection sensitivity but the erroneous detection of abnormality is likely to occur in the low number of revolution zone under normal conditions. The abnormality detection value can be made more appropriate by making the abnormality detection value smaller when the number of revolutions of the engine is greater (step S106) as in this embodiment.

In this embodiment, the processing after step S103 is executed only when the operating condition is a steady operating condition, and detection of abnormality of the piping 3a and 3b on the basis of the DPF pressure difference detection value is not executed under the transient operating condition such as during acceleration (steps S101 and S102). Therefore, accuracy of abnormality detection of the piping 3a and 3b can be further improved.

Incidentally, the amplitudes of the DPF pressure difference detection values for the four cylinders are averaged to acquire the amplitude mean value in this embodiment, but averaging may be made for more than four cylinders or for less than four cylinders. Alternatively, the amplitude of each DPF pressure difference value obtained in each crank angle 180° may be detected with the abnormality detection value described above without calculating the average.

While the invention has been described by reference to a specific embodiment chosen for purposes of illustration, it should be apparent that numerous modifications could be made thereto, by those skilled in the art, without departing from the basic concept and scope of the invention.

The invention claimed is:

1. An abnormality detection apparatus of an exhaust gas purification apparatus for an internal combustion engine, having a particulate filter for trapping particulate matters in an exhaust gas disposed at an intermediate part of an exhaust passage by introducing an inlet pressure and an outlet pressure of said particulate filter into a differential pressure sensor through respective piping, detecting a pressure difference at an inlet and an outlet of said particulate filter by using said differential pressure sensor and detecting an amount of the particulate matters accumulated to said particulate filter, said abnormality detection apparatus comprising:

pulsation measurement means for measuring a magnitude of pulsation of a detection value of said pressure difference; and abnormality detection means for detecting said piping as being abnormal when the magnitude of pulsation of said pressure difference detection value measured is greater than a predetermined reference value.

2. An abnormality detection apparatus according to claim 1, wherein said abnormality detection means sets said reference value in accordance with at least one of: (a) the number of revolutions of said internal combustion engine, (b) an engine output torque and (c) a particulate amount of said particulate filter.

3. An abnormality detection apparatus according to claim 1, wherein said abnormality detection means sets said reference value to a smaller value at least when the number of revolutions of said internal combustion engine is greater, or at least when the engine output torque is smaller or at least when the particulate amount of said particulate filter is smaller.

4. An abnormality detection apparatus according to claim 1, wherein piping connecting said particulate filter and said differential pressure sensor on the inlet side of said particulate filter is set to substantially the same length as that of piping connecting said particulate filter and said differential pressure sensor on the outlet side of said particulate filter.

5. An abnormality detection apparatus according to claim 1, wherein said pulsation measurement means calculates a mean value for multi-cylinder as the magnitude of pulsation of the detection values of said pressure difference and said abnormality detection means compares said mean value with said reference value.

6. An abnormality detection method for use in an exhaust gas purification apparatus for an internal combustion engine, having a particulate filter for trapping particulate matters in an exhaust gas disposed at an intermediate part of an exhaust passage by introducing an inlet pressure and an outlet pressure of said particulate filter into a differential pressure sensor through respective piping, detecting a pressure difference at an inlet and an outlet of said particulate filter by using said differential pressure sensor and detecting an amount of the particulate matters accumulated to said particulate filter, said abnormality detection method comprising:

measuring a magnitude of pulsation of a detection value of said pressure difference; and detecting said piping as being abnormal when the magnitude of pulsation of said pressure difference detection value measured is greater than a predetermined reference value.

7. An abnormality detection method according to claim 6, wherein said reference value is set in accordance with at least one of: (a) the number of revolutions of said internal combustion engine, (b) an engine output torque and (c) a particulate amount of said particulate filter.

8. An abnormality detection method according to claim 6, wherein said reference value is set to a smaller value at least when the number of revolutions of said internal combustion engine is greater, or at least when the engine output torque is smaller or at least when the particulate amount of said particulate filter is smaller.

9. An abnormality detection method according to claim 6, wherein piping connecting said particulate filter and said differential pressure sensor on the inlet side of said particulate filter is set to substantially the same length as that of piping connecting said particulate filter and said differential pressure sensor on the outlet side of said particulate filter.

10. An abnormality detection method according to claim 6, wherein said measuring step calculates a mean value for multi-cylinder as the magnitude of pulsation of the detection values of said pressure difference and said detecting step compares said mean value with said reference value.

* * * * *